United States Patent [19]

Minieri

[11] 3,741,979
[45] June 26, 1973

[54] N 1-SUBSTITUTED-3-HALOINDAZOLES AND THEIR USE AS PESTICIDES

[75] Inventor: Pasquale P. Minieri, Woodside, N.Y.

[73] Assignee: Tenneco Chemicals, Inc., Saddle Brook, N.J.

[22] Filed: May 10, 1971

[21] Appl. No.: 141,999

Related U.S. Application Data

[63] Continuation-in-part of Ser. No. 87,615, Nov. 6, 1970.

[52] U.S. Cl.................. 260/310 C, 71/92, 424/273
[51] Int. Cl............................................. C07d 49/18
[58] Field of Search .............................. 260/310 C

[56] References Cited
FOREIGN PATENTS OR APPLICATIONS
1,568,790  4/1969  France ........................... 260/310 C OTHER PUBLICATIONS
Pozharskii et al. J. Gen. Chem. (USSR) Vol. 34, pages 3409-11 (1964). QD1.Z6a
Auwers Liebigs Ann. Chem. Vol. 527, pages 291-8 (1937). QD1.L7
Auwers et al. Liebigs Ann. Chem. Vol. 438, pages 14-23 relied on (1924). QD1.L7

*Primary Examiner*—Natalie Trousof
*Attorney*—Daniel J. Reardon, Barry G. Magidoff, Evelyn Berlow and James P. Scullin

[57] ABSTRACT

Compounds that have the structural formula

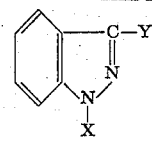

wherein X represents

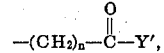

—$SCY_3$, or —$CH_2$—Z; Y represents halogen; Y' represents halo-lower alkyl or halophenyl; Z represents halogen, —SCN, —$CH_2OH$, —$CH_2Y$,

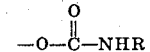

—NR—$N(R)_2$, or —N=$(CH_2)_m$; R represents hydrogen or lower alkyl; $m$ represents an integer in the range of 4 to 8; and n represents an integer in the range of 0 to 1 are used to control the growth of various plant and animal pests.

3 Claims, No Drawings

N 1-SUBSTITUTED-3-HALOINDAZOLES AND THEIR USE AS PESTICIDES

This is a continuation-in-part of my copending U.S. Pat. application Ser. No. 87,615, which was filed on Nov. 6, 1970.

This invention relates to certain N¹-substituted-3-halo-indazoles and to the use of these compounds in the control of various plant and animal pests.

In accordance with this invention, it has been found that certain N¹-substituted-3-haloindazoles have unusual and valuable activity as fungicides, as herbicides, and as bactericides. These compounds may be represented by the structural formula

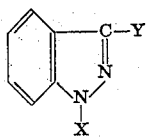

wherein X represents

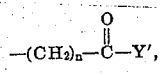

—SCY$_3$, or —CH$_2$—Z; Y represents chlorine, bromine, fluorine, or iodine; Y' represents a chloro-, bromo-, fluoro-, or iodo-lower alkyl or phenyl group; Z represents chlorine, bromine, fluorine, iodine, —SCN, —CH$_2$OH, —CH$_2$Y,

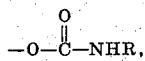

—NRNR$_2$—, or —N=(CH$_2$)$_m$; R represents hydrogen or a lower alkyl group; m represents an integer in the range of 4 to 8; and n represents an integer in the range of zero to 2.

Particularly effective as pesticides are the compounds having the aforementioned structure in which Y represents chlorine. Illustrative of these preferred compounds are the following: N¹-trichloromethylmercaptomethyl-3-chloroindazole, N¹-(p-chlorobenzoyl)-3-chloroindazole, N¹-(2,6-dichlorobenzoyl)-3-chloroindazole, N¹-(2,3,6-trichlorobenzoyl)-3-chloroindazole, N¹-(2-hydroxyethyl)-3-chloroindazole, N¹-chloromethyl-3-chloroindazole, N¹-thiocyanatomethyl-3-chloroindazole, N¹-chloroacetyl-3-chloroindazole, N¹-chloroacetoxymethyl-3-chloroindazole, 1-(3-chloroindazolyl-N¹-methyl)-2,2,-dimethylhydrazine, N-(3-chloroindazolyl-N¹-methyl)-hexamethyleneimine, (3-chloroindazolyl-N¹-methyl)-N-methylcarbamate, and the like.

The N¹-substituted-3-haloindazoles of this invention may be prepared by any suitable and convenient procedure. For example, they may be prepared by heating the appropriate substituted indazole with a compound that will react with it to form the desired N¹-substituted-3-haloindazole. Thus 3-chloroindazole may be heated with trichloromethylsulfenyl chloride to form N¹-trichloromethylmercapto-3-chloroindazole, and N¹-hydroxymethyl-3-chloroindazole may be heated with 1,1-dimethylhydrazine to form 1-(3-chloroindazolyl-N¹-methyl)-2,2-dimethylhydrazine. The reactions are generally carried out in a solvent, such as benzene, toluene, acetone, pyridine, chloroform, ethanol, or ethylene dichloride, at the reflux temperature of the reaction mixture.

The N¹-substituted-3-haloindazoles may be applied to a wide variety of fungi, bacteria, and plants to control or inhibit their growth.

In a preferred embodiment of the invention, the N¹-substituted-3-haloindazoles are used to impart fungal and bacterial resistance to surface-coating compositions including both organic solvent-based and water-based coating systems. They are particularly valuable as biocides in coatings that contain as their resinous binder either an oleoresinous material or a water-insoluble synthetic linear addition polymer.

Among the surface coating compositions in which the compounds of this invention can be used as the biocide are organic solvent-based systems that contain such oleoresinous binders as drying oils, for example, linseed oil, tung oil, soybean oil, dehydrated castor oil, safflower oil, or fish oil; bodied drying oils; blends of drying oils or bodied drying oils with a resin component, such as limed rosin, ester gum, phenolic resins; oleoresinous varnishes formed by heating the aforementioned resins with drying oils or bodied drying oils; and alkyd resins.

The novel compounds may also be used as the biocide in aqueous dispersions that contain about 10 percent to 60 percent by weight of a water-insoluble resinous binder that is an oleoresinous binder as hereinbefore defined and/or a synthetic linear addition binder. The aqueous dispersions of synthetic linear addition polymers are ordinarily prepared by the emulsion polymerization of ethylenically unsaturated compounds, especially those of monoethylenically unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl chloride with vinyl acetate, vinylidene chloride, acrylonitrile, methacrylic acid and methacrylic acid esters, acrylic acid and acrylic acid esters; polyethylene; polyisobutylene; polystyrene; copolymers of styrene with butadiene, acrylic acid esters, methacrylic acid esters, or maleic anhydride; and the like.

Only a small amount of the N¹-substituted-3-haloindazole need be present in the surface-coating compositions. As little as 0.10 percent of one or more of these compounds, based on the weight of the composition, will bring about an appreciable improvement in the resistance of the composition to attack by microorganisms. Three percent or more can be used, but these larger amounts generally do not provide further improvement in the properties of the surface-coating compositions and for this reason are not ordinarily used. In most cases about 1 percent to 2 percent of the biocidal compound, based on the weight of the surface-coating composition, is used.

In another preferred embodiment of the invention, the N¹-substituted-3-haloindazoles are used as agricultural fungicides. They can be applied to plants or to the soil in which plants are growing to control the growth of a number of plant pathogens without causing visible injury to the plants. In addition they may be used as post emergence selective herbicides.

The invention is further illustrated by the examples that follow.

EXAMPLE 1

A. A mixture of 45 grams (0.296 mole) of 3-chloroindazole, 11.1 grams (0.369 mole) of paraformaldehyde, 200 ml. of ethanol, and 2.3 ml. of 5 percent aqueous sodium hydroxide solution was heated at its reflux temperature for about 3 hours, cooled, and filtered. The solid product, which was $N^1$-hydroxymethyl-3-chloroindazole, was washed with water and dried.

B. A mixture of 36 grams (0.2 mole) of $N^1$-hydroxymethyl-3-chloroindazole, 19 ml. (0.25 mole) of thionyl chloride, and 250 ml. of ethylene dichloride was heated at its reflux temperature for 3 hours and then cooled to room temperature. The reaction mixture was heated under reduced pressure on a water bath to remove ethylene dichloride. Benzene (250 ml.) was added to the residue, and the resulting solution was heated under reduced pressure on a water bath to remove the solvent. The addition of benzene and its removal by heating under vacuum were repeated until a constant weight of product was obtained. There was obtained 39.5 grams of $N^1$-chloromethyl-3-chloroindazole, which melted at 74°–82° C. and which contained 49.76 percent C, 3.22 percent H, and 14.52 percent N (calculated, 47.8 percent C, 2.98 percent H, and 13.92 percent N).

EXAMPLE 2

A mixture of 20.1 grams (0.1 mole) of $N^1$-chloromethyl-3-chloroindazole, 9.7 grams (0.1 mole) of potassium thiocyanate, and 200 ml. of acetone was heated at its reflux temperature for 3 hours, cooled to room temperature, and allowed to stand overnight. After filtration, the filtrate was heated to remove the acetone. The residue, which crystallized on standing, was dissolved in 100 ml. of ethyl acetate. The solution was washed with 25 ml. of water and then heated to remove the solvent. There was obtained 20.3 grams of N-'-thiocyanatomethyl-3-chloroindazole, which melted at 40°–53° C. and contained 48.9 percent C, 2.97 percent H, and 18.38 percent N (calculated, 48.3 percent C, 2.02 percent H, and 18.78 percent N).

EXAMPLE 3

To a mixture of 18.1 grams (0.1 mole) of $N^1$-hydroxymethyl-3-chloroindazole, 1 ml. of triethylamine, and 150 ml. of tetrahydrofuran was added 6.4 grams (0.133 mole) of methyl isocyanate over a period of about 10 minutes during which time its temperature rose from 22° C. to 26° C. The reaction mixture was heated to its reflux temperature in 20 minutes and held at this temperature for 75 minutes. It was cooled and allowed to stand overnight at room temperature. It was then cooled in an ice bath and filtered. The product was dried at 60° C. under reduced pressure. There was obtained 15.6 grams of (3-chloroindazolyl-$N^1$-methyl) N-methyl-carbamate, which melted at 161°–167° C.

EXAMPLE 4

To 200 ml. of toluene, which had been dried by azeotropic distillation, was added with stirring 18.3 grams (0.1 mole) of $N^1$-hydroxymethyl-3-chloroindazole and 6.6 grams (0.11 mole) of 99% 1,1-dimethylhydrazine. The mixture was heated at its reflux temperature until 1.8 ml. of water had been collected and then for an additional 30 minutes. The reaction mixture was allowed to stand overnight at room temperature. It was then cooled in an ice bath and filtered. The product was dried at 50° C. under vacuum. There was obtained 9.9 grams of 1-(3-chloroindazolyl-$N^1$-methyl)-2,2-dimethylhydrazine, which melted at 145°–150° C.

The filtrate was evaporated to dryness under reduced pressure on a water bath. The residue was crystallized from 35 ml. of toluene and dried at 50° C. under reduced pressure to yield an additional 4.0 grams of the product, which melted at 145°–150° C.

The two crops of the product were combined and analyzed. The 1-(3-chloroindazolyl-$N^1$-methyl)-2,2-dimethylhydrazine contained 54.25 percent C, 2.98 percent H, and 18.23 percent N (calculated, 56.8 percent C, 6.2 percent H, and 19.9 percent N).

EXAMPLE 5

Using the procedure described in Example 4, 18.3 grams (0.1 mole) of $N^1$-hydroxymethyl-3-chloroindazole was reacted with 10 grams (0.1 mole) of hexamethyleneimine. The reaction mixture was heated on a water bath under reduced pressure until it reached constant weight. There was obtained 27.7 grams of N-(3-chloroindazolyl-$N^1$-methyl)hexamethyleneimine, which contained 63.35 percent C, 6.51 percent H, and 15.62 percent N (calculated, 65.2 percent C, 6.52 percent H, and 15.23 percent N).

EXAMPLE 6

To a mixture of 18.2 grams (0.1 mole) of $N^1$-hydroxymethyl-3-chloroindazole, 11.1 grams (0.11 mole) of triethylamine, and 200 ml. of benzene was added dropwise a solution of 12.4 grams (0.11 mole) of chloroacetyl chloride in 25 ml. of benzene. The reaction mixture was allowed to stand at room temperature for 75 minutes and was then heated at its reflux temperature for 5 minutes. It was cooled to room temperature and then cooled in an icebath.

After filtration, the filtrate was washed with two 100 ml. portions of water. Upon drying under reduced pressure on a water bath, there was obtained 23.2 grams of $N^1$-chloroacetoxymethyl-3-chloroindazole, which contained 45.41 percent C, 3.10 percent H, and 10.71 percent N (calculated, 46.2 percent C, 3.09 percent H, and 10.76 percent N).

EXAMPLE 7

A mixture of 18.1 grams (0.1 mole) of 3-chloroindazole, 7.9 grams (0.127 mole) of ethylene carbonate, and 0.11 gram of anhydrous potassium carbonate was heated at 140°–150° C. for 5 hours and then allowed to stand overnight at room temperature. The solidified reaction mixture was heated in 40 ml. of benzene until it had dissolved. The solution was cooled and filtered. After washing and drying, there was obtained 7.0 grams of $N^1$-(2-hydroxyethyl)-3-chloroindazole, which melted at 113° C.–126° C. which contained 53.69 percent C, 3.66 percent H, and 16.15 percent N (calculated, 55.0 percent C, 4.58 percent H, and 14.2 percent N).

EXAMPLE 8

To a mixture of 28 grams of 3-chloroindazole, 17.7 grams of triethylamine, and 250 ml. of benzene which was being heated at its reflux temperature was added over a period of 40 minutes 34.4 grams of trichloromethanesulfenyl chloride. The resulting mixture was heated at its reflux temperature for 2.5 hours, cooled to room temperature, and filtered. The filtrate was washed with two 100 ml. portions of water and then heated to remove the benzene. The $N^1$-trichloromethylmercapto-3-chloroindazole obtained was a liquid that contained 33.0 percent C, 1.48 percent H, and 9.56 percent N (calculated, 31.7 percent C, 1.32 percent H, and 9.22 percent N).

EXAMPLE 9

To a mixture of 15.3 grams (0.1 mole) of 3-chloroindazole, 15.2 ml. (0.11 mole) of triethylamine, and 150 ml. of chloroform which has been heated to its reflux temperature was added over a period of 30 minutes a solution of 21.6 grams (0.1 mole) of 3,4-dichlorbenzoyl chloride in 25 ml. of chloroform. The reaction mixture was heated at its reflux temperature for 2 hours, cooled to room temperature, and allowed to stand at room temperature for about 60 hours. It was then cooled in an icebath. The precipitated solid material was separated by filtration and air-dried. There was obtained 18.5 grams of $N^1$-(3,4-dichlorobenzoyl)-3-chloro-indazole, which melted at 144°–146° C.

The mother liquor was washed twice with water and then evaporated to dryness. The residue was crystallized from benzene to yield an additional 6.8 grams of crude product. This product was stirred with 5 percent aqueous sodium carbonate solution. The product was separated by filtration, washed with water, and dried. There was obtained 5.8 grams of material that melted at 142.5°–145° C. This material was combined with that obtained as the first crop and the mixture was recrystallized from ethyl acetate. The purified $N^1$-(3,4-dichlorobenzoyl)-3-chloroindazole obtained melted at 144°–145° C. and contained 51.79 percent C, 1.99 percent H, 8.47 percent N, and 32.83 percent Cl (calculated 53.9 percent C, 2.25 percent H, 8.98 percent N, and 32.83 percent Cl).

EXAMPLE 10

To a mixture of 8.53 grams (0.05 mole) of 3-chloroindazole, 8 ml. (0.05 mole) of triethylamine, and 100 ml. of benzene which had been heated to its reflux temperature was added over a period of ten minutes 4.5 ml. (0.058 mole) of chloroacetyl chloride. The reaction mixture was heated at its reflux temperature for 2 hours and then filtered while hot. The filtrate was heated under reduced pressure at 50° C. to remove the benzene. The solid product obtained when the residue was cooled was dissolved in 200 ml. benzene; the resulting solution was washed with water and then with carbon tetrachloride. Upon removal of the benzene, there was obtained 12 grams of $N^1$-chloroacetyl-3-chloroindazole that melted at 74.0°–84.5° C. and that contained 46.72 percent C, 2.87 percent H, 11.87 percent N, and 29.52 percent Cl (calculated, 47.2 percent C, 2.62 percent H, 12.2 percent N, and 31.0 percent Cl).

EXAMPLE 11

A. A polyvinyl acetate emulsion paint was prepared by mixing together the following materials:

| | Parts by Weight |
|---|---|
| Water | 280 |
| Potassium pyrophosphate | 3 |
| Calcium metasilicate | 135 |
| Titanium dioxide (rutile) | 220 |
| 2% Aqueous solution of methylcellulose | 200 |
| Diethyl ether of diethylene glycol | 37 |
| 55% Aqueous dispersion of polyvinyl acetate | 350 |

To samples of this paint was added either 2 percent by weight of one of the compounds of this invention or 2 percent by weight of a comparative biocide.

B. An acrylic paint was prepared by mixing together the following materials:

| | Parts by Weight |
|---|---|
| Water | 250 |
| Acrylic acid resin (100% solids)(Acryloid B-66) | 385 |
| Monoethyl ether of ethylene glycol | 259 |
| Titanium dioxide | 143 |
| Aluminum silicate | 45 |
| Magnesium silicate | 98 |

To samples of this paint was added either 2 percent by weight of one of the compounds of this invention or 2 percent by weight of a comparative biocide.

C. An exterior house paint was prepared by mixing together the following materials:

| | Parts by Weight |
|---|---|
| Basic lead carbonate | 288 |
| Zinc oxide | 232 |
| Titanium dioxide (rutile) | 149 |
| Talc | 260 |
| | Parts by Weight |
| Linseed oil | 242 |
| Bodied Linseed Oil | 114 |
| Mineral Spirits | 114 |
| Antiskinning agent (Exkin 2) | 2 |
| Manganese naphthenate (6%) | 2.27 |
| Lead naphthenate (24%) | 11.3 |

To samples of this paint was added 2 percent by weight of either one of the compounds of this invention or a comparative biocide.

EXAMPLE 12

Samples of the acrylic paint, the polyvinyl acetate paint, and the oil-based paint whose preparation was described in Example 11 were evaluated by the following procedure: Pieces of drawdown paper were dipped into the paint, dried for 24 hours, and again dipped into the paint. After a 24-hour drying perod, the coated paper samples were cut into 1¼ inch squares. Each of the coated paper squares was placed on a plate of malt and mycophil agar, which had been inoculated with 1 ml. of a suspension of the test organism. The plates, prepared in triplicate, were incubated at 28° C. and observed weekly. The growth was estimated according to the following key, and the results of the triplicate plates were averaged. In the tables that follow ZO — Zone of inhibition in mm.
O — No zone of inhibition
Tr — Trace of zone of inhibition
— — Not tested
Bacteria A — *Bacillus subtilis*
B — *Aerobacter aerogenes*
C — *Pseudomonas aeruginoso*
Fungi D — *Pullularia pullulans*
E — *Penicillium crustosum*
F — *Aspergillus niger*

The biocidal compounds tested and the results obtained are set forth in Table I.

EXAMPLE 13

$N^1$-Trichloromethylmercapto-3-chloroindazole was evaluated as a post-emergence herbicide by spraying seedlings of various plant species with an aqueous solution that contained 1000 ppm of the test compounds and observing the results after 43 days. A numerical scale is used in Table II to show the herbicidal activity of this compound. On this scale 1 indicates that no injury was caused to the plants, 2 indicates slight injury, 3 indicates moderate injury, 4 indicates severe injury, and 5 indicates that all plants were killed.

EXAMPLE 14

Separate lots of sterilized soil were inoculated with plant pathogens. The inoculated soil was placed in 4-ounce containers, and the soil in each container was drenched with 30 ml. of an aqueous solution of $N^1$-trichloromethylmercapto-3-chloroindazole. After incubation for two days at 70° F., the amount of mycelial growth on the surface of the soil was noted. The results of these tests are given in Table III. In this table a rating of 1 indicates that the surface of the soil was completely covered with colonies of the organism, 2 indicates that about 75 percent of the surface was covered with colonies of the organism, 3 indicates that about half of the surface was covered with colonies of the organism, 4 indicates that a few scattered colonies were present, and 5 indicates that there was no mycelial growth on the surface of the soil.

TABLE III

Activity of
$N^1$-Trichloromethylmercapto-3-chloroindazole as a
Soil Fungicide

| Rate of Application (lb/acre) | Sclerotium rolfsii | Pythium sp. | Rhizoctonia solani | Fusarium oxysporum |
|---|---|---|---|---|
| 300 | 5 | 5 | 4 | 5 |
| 150 | 4 | 1 | 4 | 3 |
| 75 | 2 | 1 | 1 | 1 |

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

TABLE I

| Biocide | Paint | pH | Effect on paint odor | Biocidal activity ||||||
|---|---|---|---|---|---|---|---|---|---|
| | | | | Bacteria ||| Fungi |||
| | | | | A | B | C | D | E | F |
| Product of Example 1 | Acrylic | 7.1 | Slight | ZO-2 | 0 | 0 | 0 | 0 | 0 |
| | PVA | 5.0 | | Tr | Tr | Tr | | | |
| | Oil | | | | | | | | |
| Product of Example 2 | Acrylic | 8.2 | Strong | ZO-5 | 0 | 0 | ZO-1 | ZO-4 | ZO-3 |
| | PVA | 7.2 | Moderate | ZO-3 | 0 | 0 | ZO-1 | ZO-3 | Tr |
| | Oil | | Slight | | | | ZO-2 | ZO-4 | ZO-1 |
| Product of Example 3 | Acrylic | 9.3 | None | Tr | 0 | 0 | 0 | 0 | ZO-7 |
| | PVA | 7.4 | do | 0 | 0 | 0 | 0 | 0 | 0 |
| | Oil | | do | | | | 0 | 0 | 0 |
| Product of Example 4 | Acrylic | 9.1 | Moderate | 0 | 0 | 0 | ZO-2 | ZO-7 | ZO-1 |
| | PVA | 7.4 | do | 0 | 0 | 0 | Tr | ZO-5 | Tr |
| | Oil | | None | | | | ZO-4 | ZO-5 | ZO-2 |
| Product of Example 5 | Acrylic | 9.3 | None | ZO-3 | ZO-1 | ZO-2 | ZO-2 | ZO-3 | ZO-1 |
| | PVA | 8.4 | Slight | ZO-6 | ZO-5 | ZO-3 | Tr | ZO-6 | ZO-2 |
| | Oil | | do | | | | ZO-4 | ZO-5 | ZO-2 |
| Product of Example 6 | Acrylic | 7.2 | Moderate | ZO-3 | 0 | 0 | Tr | ZO-3 | 0 |
| | PVA | 7.2 | None | ZO-1 | 0 | 0 | Tr | ZO-5 | Tr |
| | Oil | 7.2 | do | | | | ZO-3 | ZO-5 | ZO-2 |
| Product of Example 7 | Acrylic | 8.9 | None | 0 | 0 | 0 | 0 | 0 | 0 |
| | PVA | 7.3 | Slight | 0 | 0 | 0 | Tr | 0 | 0 |
| | Oil | | None | | | | ZO-3 | ZO-6 | ZO-3 |
| Product of Example 8 | Acrylic | 7.2 | None | 0 | 0 | 0 | ZO-3 | ZO-2 | ZO-3 |
| | PVA | 6.5 | do | ZO-1 | 0 | 0 | ZO-3 | ZO-2 | ZO-3 |
| | Oil | | do | | | | ZO-2 | ZO-2 | ZO-3 |
| Bis(phenylmercury)dodecenylsuccinate (Super Ad-it) | Acrylic | 8.4 | None | ZO-9 | | ZO-6 | ZO-9 | ZO-1 | ZO-10 |
| | PVA | 6.9 | do | ZO-10 | ZO-2 | ZO-7 | ZO-17 | ZO-6 | ZO-13 |
| | Oil | | do | | | | ZO-8 | ZO-42 | ZO-10 |
| 2,3,5,6-tetrachloro-4-(methylsulfonyl)-pyridine (Dow 1613) | Acrylic | 9.2 | None | ZO-8 | 0 | 0 | ZO-13 | ZO-7 | ZO-6 |
| | PVA | 7.3 | do | ZO-8 | 0 | 0 | ZO-13 | ZO-10 | ZO-6 |
| | Oil | | do | | | | ZO-12 | ZO-10 | ZO-9 |

TABLE II

Activity of
$N^1$-Trichloromethylmercapto-3-chloroindazole as a
Post-emergence Herbicide

| Rate of Application (lb/acre) | Herbicidal Activity |||
|---|---|---|---|
| Plant Species | 20 | 10 | 5 |
| Clover | 4 | 3 | 2 |
| Soybean | 3 | 2 | 2 |
| Sugar Beet | 4 | 4 | 3 |
| Cotton | 2 | 2 | 2 |
| Corn | 2 | 2 | 2 |
| Oats | 5 | 2 | 1 |
| Mustard | 5 | 3 | 1 |
| Morning Glory | 2 | 2 | 1 |
| Buckwheat | 5 | 3 | 2 |
| Rye Grass | 4 | 3 | 1 |
| Crab Grass | 5 | 2 | 1 |
| Fox Tail | 3 | 2 | 2 |

What is claimed is:

1. A compound having the structural formula

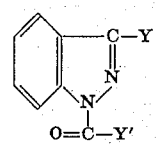

wherein Y represents halogen and Y' represents halo-lower alkyl or halophenyl.

2. The compound as set forth in claim 1 that is $N^1$-(3,4-dichlorobenzoyl)-3-chloroindazole.

3. The compound as set forth in claim 1 that is $N^1$-chloroacetyl-3-chloroindazole.

* * * * *